United States Patent
Lin et al.

(10) Patent No.: US 11,626,595 B2
(45) Date of Patent: *Apr. 11, 2023

(54) SOLID OXIDE FUEL CELL CATHODE MATERIALS

(71) Applicant: PHILLIPS 66 COMPANY, Houston, TX (US)

(72) Inventors: Ye Lin, Bartlesville, OK (US); Ying Liu, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/169,884

(22) Filed: Feb. 8, 2021

(65) Prior Publication Data

US 2021/0249665 A1    Aug. 12, 2021

Related U.S. Application Data

(60) Provisional application No. 62/972,907, filed on Feb. 11, 2020.

(51) Int. Cl.
| | |
|---|---|
| *H01M 4/90* | (2006.01) |
| *H01M 8/1213* | (2016.01) |
| *H01M 4/86* | (2006.01) |
| *H01M 8/12* | (2016.01) |

(52) U.S. Cl.
CPC ....... *H01M 4/9033* (2013.01); *H01M 4/8652* (2013.01); *H01M 8/1213* (2013.01); *H01M 8/12* (2013.01); *H01M 2004/8689* (2013.01); *H01M 2008/128* (2013.01)

(58) Field of Classification Search
CPC .... H01M 4/8652; H01M 8/12; H01M 8/1213; H01M 8/124; H01M 8/1253; H01M 2008/128
See application file for complete search history.

(56) References Cited

U.S. PATENT DOCUMENTS

| | | | | |
|---|---|---|---|---|
| 2013/0108943 A1* | 5/2013 | Yamanis | ............. | H01M 8/1226 429/507 |
| 2014/0017587 A1* | 1/2014 | Ueda | ................... | H01M 8/0282 429/510 |
| 2014/0051006 A1* | 2/2014 | Hwang | ............... | H01M 8/1213 427/446 |

FOREIGN PATENT DOCUMENTS

| | | | |
|---|---|---|---|
| CN | 101179128 A | * | 5/2008 |
| CN | 101359739 A | * | 2/2009 |
| KR | 20160054897 A | * | 5/2016 |

* cited by examiner

*Primary Examiner* — Jeremiah R Smith
(74) *Attorney, Agent, or Firm* — Phillips 66 Company

(57) ABSTRACT

A cathode in a solid oxide fuel cell containing $AgPrCoO_3$. The operating temperature range of the cathode is from about 400° C. to about 850° C.

2 Claims, 3 Drawing Sheets

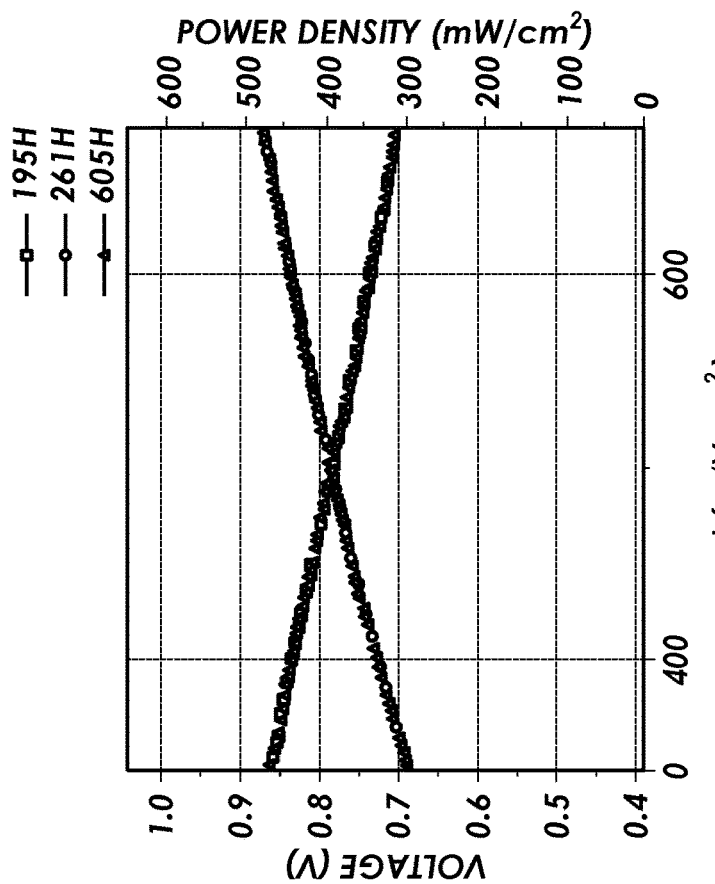
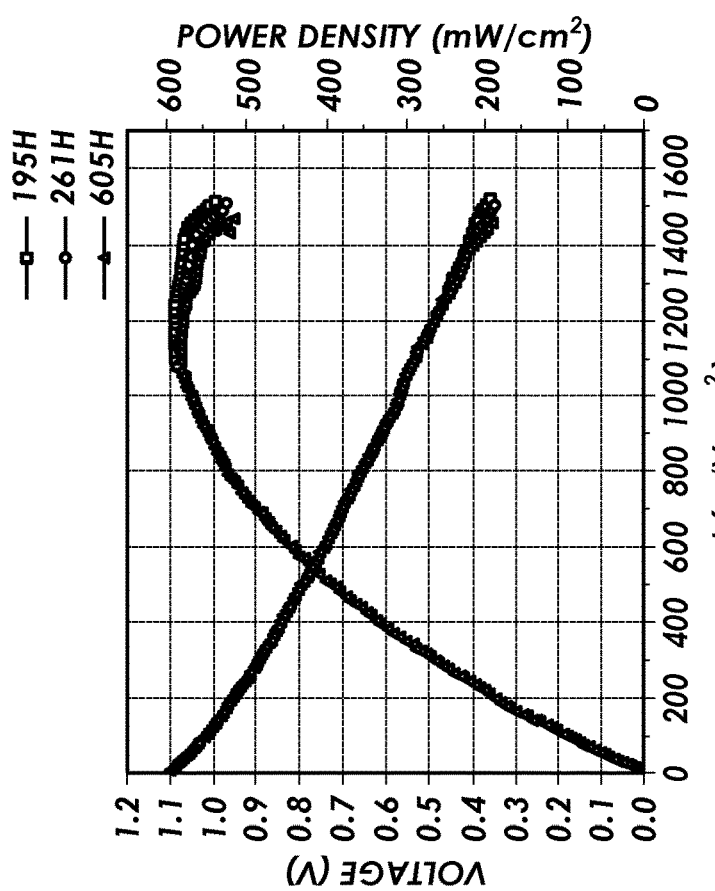
FIG. 2B
FIG. 2A

SOLID OXIDE FUEL CELL CATHODE MATERIALS

CROSS-REFERENCE TO RELATED APPLICATIONS

This application is a non-provisional application which claims the benefit of and priority to U.S. Provisional Application Ser. No. 62/972,907 filed Feb. 11, 2020, entitled "Solid Oxide Fuel Cell Cathode Materials," which is hereby incorporated by reference in its entirety

STATEMENT REGARDING FEDERALLY SPONSORED RESEARCH OR DEVELOPMENT

None.

FIELD OF THE INVENTION

This invention relates to a solid oxide fuel cell cathode material.

BACKGROUND OF THE INVENTION

A solid oxide fuel cell (SOFC) is an electromechanical device that continuously converts chemical energy into electrical energy by exploiting the natural affinity of oxygen and hydrogen to react. By controlling the means by which such a reaction occurs and directing the reaction through a device it is possible to harvest the electrical energy given off by the reaction.

Generally, an SOFC stack repeat unit contains multiple layers such as a support substrate, an active anode layer, an electrolyte layer, a barrier layer, a cathode, an interconnect, an anode current collecting layer, a cathode current collecting layer, an anode seal, and a cathode seal.

There exists a need for new novel cathode components for SOFC's that would enable greater electrical output and lower material and fabrication costs.

BRIEF SUMMARY OF THE DISCLOSURE

A cathode in a solid oxide fuel cell containing $AgPrCoO_3$. The operating temperature range of the cathode is from about 400° C. to about 850° C.

A composite cathode in a solid oxide fuel cell. The composite cathode comprises $AgPrCoO_3$ and $Gd_{0.1}Ce_{0.9}O_2$. The operating temperature range of the cathode is from about 400° C. to about 800° C.

BRIEF DESCRIPTION OF THE DRAWINGS

A more complete understanding of the present invention and benefits thereof may be acquired by referring to the follow description taken in conjunction with the accompanying drawings in which:

FIG. 1a depicts $CoO_3$—$Gd_{0.1}Ce_{0.9}O_2$ and $Ag_{0.1}$.

FIG. 2a depicts the current voltage and current power density curves of a fuel cell with $Ag_{0.1}Pr_{0.9}CoO_3$-GDC cathode tested in hydrogen at 650° C. FIG. 2b is an enlarged section of FIG. 2a near 0.8 V.

DETAILED DESCRIPTION

Figure 1A:
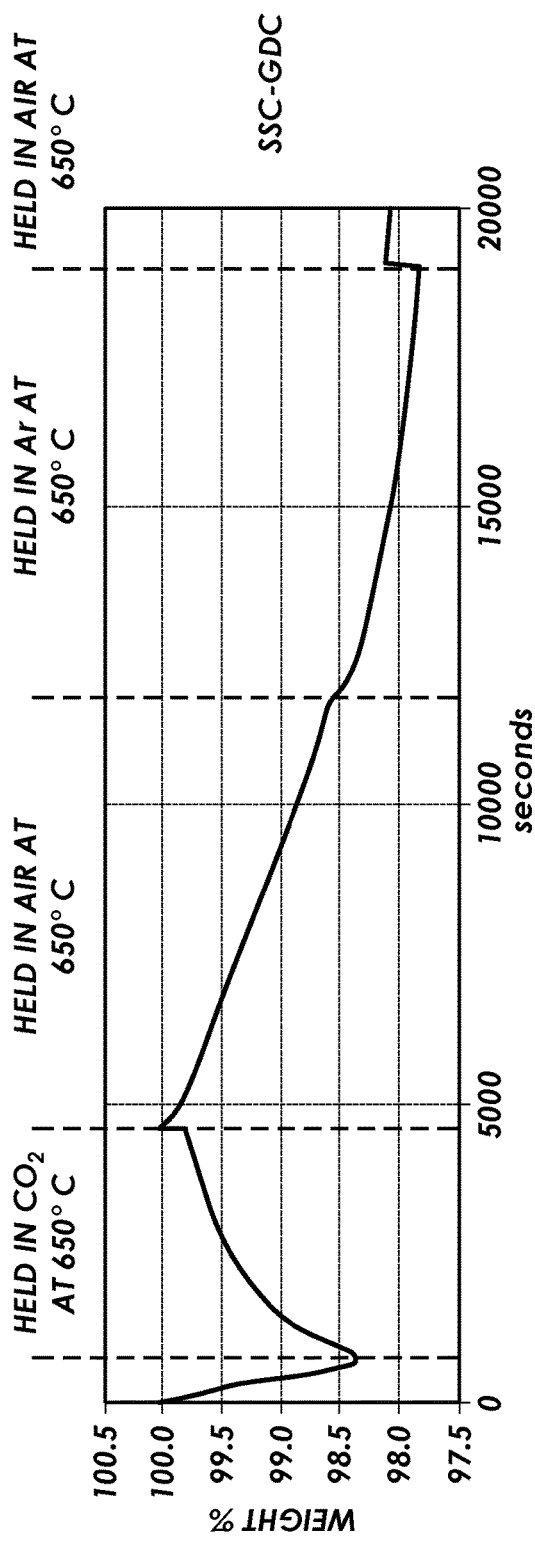
FIG. 1a depicts the thermogravimetric analysis (TGA) results of the state-of-the-art conventional SOFC cathode material $Sm_{0.5}Sr_{0.5}$.

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

As briefly introduced above, the present embodiment provides a cathode material $AgPrCoO_3$. The operating temperature range of the cathode is from about 400° C. to about 850° C. It is theorized that this new material when mixed with gadolinium doped ceria (GDC) exhibits superior mixed ionic and electronic conductivities, partially by overcoming stability issues of other cathode materials. It is also theorized that $AgPrCoO_3$ (APC) show excellent long-term stability in $CO_2$ containing environments. In one embodiment, use of $AgPrCoO_3$ as a cathode material eliminates the use of barrier layers such as gadolinium doped ceria which has the ability to significantly reduce the material and fabrication costs of SOFCs.

In one embodiment, $AgPrCoO_3$ is made from Ag doping $PrCoO_3$. This produces Ag doping levels of $Ag_xPr_{1-xx}CoO_3$, x=0.05-0.15. In one non-limiting embodiment, the doping of $PrCoO_3$ can be done by first dissolving metal nitrate hydrates with stoichiometric ratio in deionized water. Citric acid (CA) was added as a chelating agent with a CA-to-nitrate-ion molar ratio of around 1:2. Appropriate amount of ammonia water was then added to adjust the PH to ~6. The resulting clear solution was heated at 90° C. for a prolonged period until a clear gel was formed. The gel was placed in an oven overnight at 150° C. to form a foam. The foam was then grinded and calcined at 800° C. for around 5 hours.

For cathode ink preparation, Ag doped $PrCoO_3$ were mixed with GDC powder in a weight ratio of 60:40. The composite cathode powder was further mixed with ink vehicle (Fuel cell materials) in a weight ratio of 60:40. The mixture was milled in a high energy ball mill at 350 rpm for 1 hour to form the cathode ink. The cathode ink was applied onto fuel cells with a cathode area of 12.25 $cm^2$.

Sample Preparation:

Two types of baseline cells with yttria-stabilized zirconia (YSZ) electrolyte were produced:

Type-1: NiO+YSZ anode/YSZ electrolyte/GDC barrier layer/APC-GDC cathode

Type-2: NiO+YSZ anode/YSZ electrolyte/APC-GDC cathode

Type-1 cells had a GDC hairier layer and Type-2 cells didn't contain a GDC barrier layer between cathode and electrolyte layers.

The cathode was sintered at 900° C. or 950° C. for 2 hours, at a 2° C./min ramp rate. All fuel cells were held at 800° C. overnight in hydrogen before electrochemical testing. The fuel cell performance was evaluated between 500 to 750° C., and the impedance curves were taken at 650° C. under open circuit condition.

Type-1 Cells Evaluation

Table 1 below shows a summary of fuel cell performance with different cathode materials at 0.8V and 650° C. or 700° C. Based on Type-1 fuel cells, the $Ag_{0.1}Pr_{0.9}CoO_3$-GDC cathode showed the highest performance, which was higher than that of conventional $Sr_{0.5}Sm_{0.5}CoO_3$ (SSC)-GDC and $La_{0.6}Sr_{0.4}Co_{0.2}Fe_{0.8}O_3$ (LSCF)-GDC cathodes.

TABLE 1

| Material Composition | 650° C. and 0.8V (mW/cm$^2$) | 700° C. and 0.8V (mW/cm$^2$) |
|---|---|---|
| SSC-GDC | 380 | 540 |
| LSCF-GDC | 377 | 537 |
| $SrCo_{0.8}Ta_{0.1}Nb_{0.1}O_3$ (SCTN) | 268 | 398 |
| $PrBa_{0.5}Sr_{0.5}Co_{1.5}Fe_{0.5}O_{5+\delta}$ (PBSCF) | 372 | 509 |
| $PrCoO_3$-GDC | 308 | 469 |
| $Ag_{0.05}Pr_{0.95}CoO_3$-GDC | 355 | 355 |
| $Ag_{0.1}Pr_{0.9}CoO_3$-GDC | 437 | 636 |
| $Ag_{0.15}Pr_{0.85}CoO_3$-GDC | 405 | 600 |

The performance stability of $Ag_{0.1}Pr_{0.9}CoO_3$-GDC cathode in $CO_2$ environment was evaluated using thermogravimetric analysis (TGA).

The TGA program was as follows:
(1) 25 to 600° C., 50° C./min ($CO_2$)
(2) 600 to 650° C., 10° C./min ($CO_2$)
(3) 650° C., 60 min ($CO_2$)
(4) 650° C., 120 min (Air)
(5) 650° C., 120 min (Argon)
(6) 650° C., 30 min (Air)

Figure 1B:
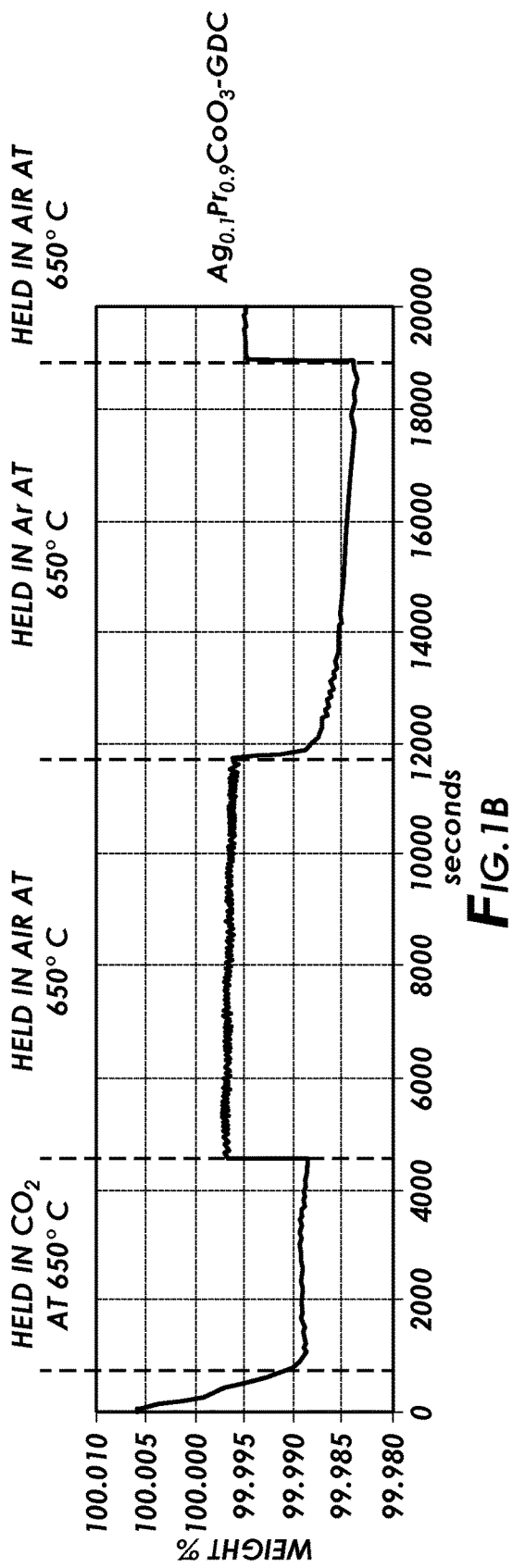
FIG. 1b shows $Pr_{0.9}CoO_3$—$Gd_{0.1}Ce_{0.9}O_2$.

FIG. 1a depicts the TGA results of (a) SSC-GDC cathode materials. FIG. 1b depicts the TGA results of $Ag_{0.1}Pr_{0.9}CoO_3$-GDC cathode materials. As shown in FIG. 1a and FIG. 1b, at 650° C., the SSC-GDC readily absorbed $CO_2$, and started gaining weight due to $SrCO_3$ formation, while the $Ag_{0.1}Pr_{0.9}CoO_3$-GDC showed no weight change. After switching to pure air, the SSC-GDC gradually lost weight due to the decomposition of $SrCO_3$ while $Ag_{0.1}Pr_{0.9}CoO_3$-GDC experienced no weight change in the same period of time. After holding in air for 2 hours, a quick switch from air to Ar was carried out. Due to the formation of $SrCO_3$, the SSC-GDC cathode experienced a slow weight loss comparing to a sharp change for $Ag_{0.1}Pr_{0.9}CoO_3$-GDC. This indicated the $Ag_{0.1}Pr_{0.9}CoO_3$-GDC has maintained high oxygen reduction reaction activity/performance even after a 100% $CO_2$ treatment. The SSC-GDC cathode, however, significantly reduced the performance.

The migration of Sr to the surface of the cathode was found to be an intrinsic property of the Sr containing cathode materials. The Sr readily reacted with YSZ electrolyte and formed a $SrZrO_3$ insulator. To avoid the adversary reaction, a common practice is to apply a ceria-based barrier layer at the cathode-electrolyte interface. However, a $CeZrO_x$ solid solution layer with much lower conductivity might form after high temperature treatment. The $CeZrO_x$ solid solution layer could grow in thickness under SOFC operation condition. Besides, it is extremely hard to make a fully dense GDC layer on top of the YSZ electrolyte. With a porous GDC barrier layer, $SrZrO_3$ layer was still found on the YSZ side of the GDC barrier layer and its thickness increased over time under electrical load.

Type-2 Cells Evaluation

Table 2 below summarizes the fuel cell performance with different cathode materials directly applied on YSZ electrolyte (Type-2 cell). The SSC+GDC cathode was directly sintered onto the YSZ at 950° C., while both the $Ag_{0.05}Pr_{0.95}CoO_3$-GDC and $Ag_{0.1}Pr_{0.9}CoO_3$-GDC were sintered onto YSZ at 900° C.

TABLE 2

| Material Composition | 650° C. and 0.8V (mW/cm$^2$) | 700° C. and 0.8V (mW/cm$^2$) |
|---|---|---|
| SSC-GDC | 22 | 56 |
| $Ag_{0.05}Pr_{0.95}CoO_3$-GDC | 395 | 532 |
| $Ag_{0.1}Pr_{0.9}CoO_3$-GDC | 380 | 554 |

The SSC-GDC cathode showed only 22 mW/cm$^2$ power density at 0.8V and 650° C. due to the formation of $SrZrO_3$ layer, while both the $Ag_{0.05}Pr_{0.95}CoO_3$-GDC and $Ag_{0.1}Pr_{0.9}CoO_3$-GDC demonstrated a high performance of over 380 mW/cm$^2$.

The stability of the $Ag_{0.1}Pr_{0.9}CoO_3$-GDC cathode directly applied on YSZ electrolyte was evaluated in a 645.5 hours fuel cell test. The I-V curve at 650° C. and different fuel cell operation times of 195 hours, 261 hours and 605 hours are shown in FIG. 2a. FIG. 2b shows an enlarged section of I-V curve at 650° C. and different fuel cell operation times of 195 hours, 261 hours. The 605 h I-V curve was recorded after a 144 h test in 1.6% $CO_2$ containing air and a 130 h accelerated test with a high current density of 1368 mA/cm$^2$. A stable performance of 380 mW/cm$^2$ at 650° C. and 0.8V was maintained after the long-term test as shown in FIG. 2a and FIG. 2b.

Figure 3:
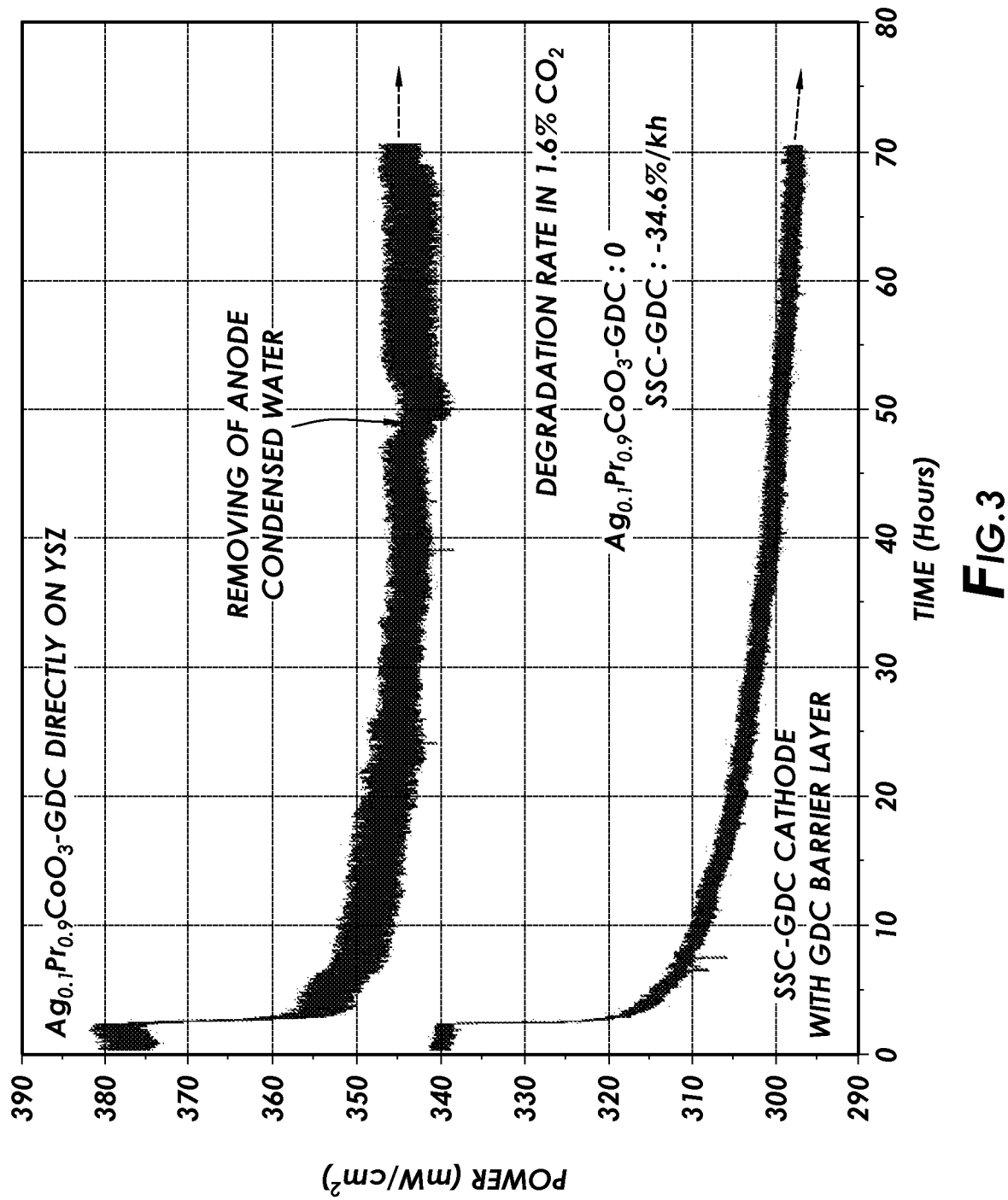
FIG. 3 depicts fuel cell performance at 0.8V and 650° C. for $Ag_{0.1}Pr_{0.9}CoO_3$-GDC cathode directly applied on YSZ electrolyte and SSC-GDC cathode with a GDC barrier layer. Cathode feed air contained 1.6% $CO_2$.

During the long-term test, the cathode feed gas was switched from pure air to air containing 1.6% $CO_2$. FIG. 3 shows that the $Ag_{0.1}Pr_{0.9}CoO_3$-GDC cathode reached a steady stage during the 70 hours test in 1.6% $CO_2$ mixed air, while the SSC-GDC cathode showed a high degradation rate of 34.6%/kh under the same test condition.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A composite cathode in a solid oxide fuel cell comprising:
   $AgPrCoO_3$; and
   $Gd_{0.1}Ce_{0.9}O_2$,
   wherein the operating temperature range of the cathode is from about 400° C. to about 800° C.,
   wherein the weight ratio of $AgPrCoO_3$ to $Gd_{0.1}Ce_{0.9}O_2$ is 60:40.

2. The composite cathode of claim 1, wherein the solid oxide fuel cell utilizes a doped ceria barrier layer.

* * * * *